(12) United States Patent
Payton et al.

(10) Patent No.: US 7,613,673 B2
(45) Date of Patent: Nov. 3, 2009

(54) ITERATIVE PARTICLE REDUCTION METHODS AND SYSTEMS FOR LOCALIZATION AND PATTERN RECOGNITION

(75) Inventors: David W. Payton, Calabasas, CA (US); Scott D. G. Smith, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 338 days.

(21) Appl. No.: 11/550,738

(22) Filed: Oct. 18, 2006

(65) Prior Publication Data

US 2008/0154834 A1 Jun. 26, 2008

(51) Int. Cl.
*G06N 5/02* (2006.01)
(52) U.S. Cl. ...................................................... 706/48
(58) Field of Classification Search .................... 706/48
See application file for complete search history.

(56) References Cited

U.S. PATENT DOCUMENTS

| | | | | |
|---|---|---|---|---|
| 6,507,771 B2* | 1/2003 | Payton et al. | ............... | 700/245 |
| 6,507,802 B1* | 1/2003 | Payton et al. | ............... | 702/150 |
| 6,580,979 B2* | 6/2003 | Payton et al. | ................. | 701/25 |
| 6,681,247 B1* | 1/2004 | Payton | ....................... | 709/217 |
| 7,158,511 B2* | 1/2007 | Payton | ....................... | 370/389 |
| 7,248,062 B1* | 7/2007 | Samsavar et al. | ........... | 324/750 |
| 7,379,840 B2* | 5/2008 | Payton et al. | ............... | 702/150 |

OTHER PUBLICATIONS

Howard et al., "Putting the 'I' in 'Team': An Ego-Centric Approach to Cooperative Localization," Proc. of IEEE Int'l Conf. on Robotics and Automation, Taipei, Taiwan (May 200).
Thrun et al., "Robust Monte Carlo Localization for Mobile Robots," Artificial Intelligence (Summer 2001).

* cited by examiner

*Primary Examiner*—Michael B Holmes

(57) ABSTRACT

Systems and methods using iterative particle reduction for localization and pattern recognition are disclosed. In one embodiment, a method for localization of a plurality of sensor nodes includes establishing a set of particles representing candidate positions for the plurality of sensor nodes; iteratively reducing the set of particles using a plurality of particle reduction iterations, wherein each particle reduction iteration eliminates at least some particles based on at least one constraint and a set of remaining particles from a prior iteration; and after performing the plurality of particle reduction iterations, determining a set of probable locations of the plurality of sensor nodes based on a final set of particles.

29 Claims, 6 Drawing Sheets

Initial Sensor Placement

Initial Particles

Particle "boil off"

Final Remaining Particles Indicate Actual Sensor Positions

ITERATIVE PARTICLE REDUCTION METHODS AND SYSTEMS FOR LOCALIZATION AND PATTERN RECOGNITION

FIELD OF THE INVENTION

The present invention generally relates to pattern recognition, and more particularly, to systems and methods using iterative particle reduction for localization and pattern recognition.

BACKGROUND OF THE INVENTION

Existing localization systems typically use particle filters and a priori maps. For example, in a typical prior art system, a set of particles (or hypotheses) is used to represent the estimated position of a mobile device, such as a mobile robot. As the robot moves, the particles (or hypotheses of sensor node positions) are updated using a statistical motion model to arrive at a new estimate of the robot's position. Generally, without the introduction of any additional knowledge, the more a robot moves, the more dispersed the particles will become. With the introduction of known obstacles or observable structures, however, robot motion can reduce the particle dispersion because these obstacles or structures constrain allowable particle movement, and those particles that violate these constraints can be eliminated. In general, however, once these types of constraints have been applied, there is no further benefit to applying them again until particles are once again moved.

SUMMARY OF THE INVENTION

The present invention is directed to iterative particle reduction methods and systems for various applications, including localization and pattern recognition. Embodiments of the present invention may advantageously provide the ability to aggregate relatively weak and ambiguous data from multiple distributed sources in order to match this data to an underlying pattern. By repeatedly eliminating particles and then reapplying constraints in an iterative manner, a solution set of particles may be achieved that provide the best fit to the underlying pattern. Particular embodiments of the invention may be successfully applied to the problem of localizing a distributed set of sensors without the aid of GPS. Furthermore, embodiments of the invention may advantageously provide the capability to determine sensor positions both with a threshold-based algorithm that works with little or approximately no noise, as well as with a probabilistic algorithm that works with noisy data and noisy sensor readings. Still further embodiments provide the ability to exploit movement, either of the sensors or of the underlying pattern, to further enhance localization accuracy.

In one embodiment, a method for localization of a plurality of sensor nodes includes establishing a set of particles representing candidate positions for the plurality of sensor nodes; iteratively reducing the set of particles using one or more particle reduction iterations, wherein each particle reduction iteration other than an initial particle reduction iteration eliminates at least some particles based on at least one constraint and a set of remaining particles from a prior iteration; and after performing the one or more particle reduction iterations, determining a set of probable locations of the plurality of sensor nodes based on a final set of particles.

In another embodiment, a method for localization of a plurality of sensor nodes includes establishing a set of particles representing candidate positions for the plurality of sensor nodes; iteratively reducing the set of particles using one or more particle reduction iterations, wherein each particle reduction iteration includes at least one of: performing a bottom-up reduction procedure; and performing a top-down reduction procedure; and, after performing the one or more particle reduction iterations, determining a set of probable locations of the plurality of sensor nodes based on a final set of particles.

In yet another embodiment, a method for localization of a plurality of moveable nodes includes establishing a set of particles representing candidate positions for the plurality of moveable nodes; iteratively reducing the set of particles using one or more particle reduction iterations to provide a set of highest scoring particles, wherein each particle reduction iteration other than an initial particle reduction iteration eliminates at least some particles based on at least one constraint and a set of remaining particles from a prior iteration; modeling a movement of the plurality of moveable nodes by establishing a set of moving particles; iteratively reducing the set of moving particles using one or more moving particle reduction iterations to provide a final set of moving particles, wherein each moving particle reduction iteration other than an initial moving particle reduction iteration eliminates at least some moving particles based on at least one constraint and a set of remaining moving particles from a prior iteration; and after performing the one or more moving particle reduction iterations, determining a set of probable locations of the plurality of moveable nodes based on the final set of moving particles.

In a further embodiment, a method of navigating at least one moveable device includes establishing a set of particles representing candidate positions for the at least one moveable device; iteratively reducing the set of particles using one or more particle reduction iterations, wherein each particle reduction iteration other than an initial particle reduction iteration eliminates at least some particles based on at least one constraint and a set of remaining particles from a prior iteration; after performing the plurality of particle reduction iterations, determining a probable location of the at least one moveable device based on a final set of particles.

BRIEF DESCRIPTION OF THE DRAWINGS

Embodiments of the present invention are described in detail below with reference to the following drawings.

DETAILED DESCRIPTION

Figure 1:
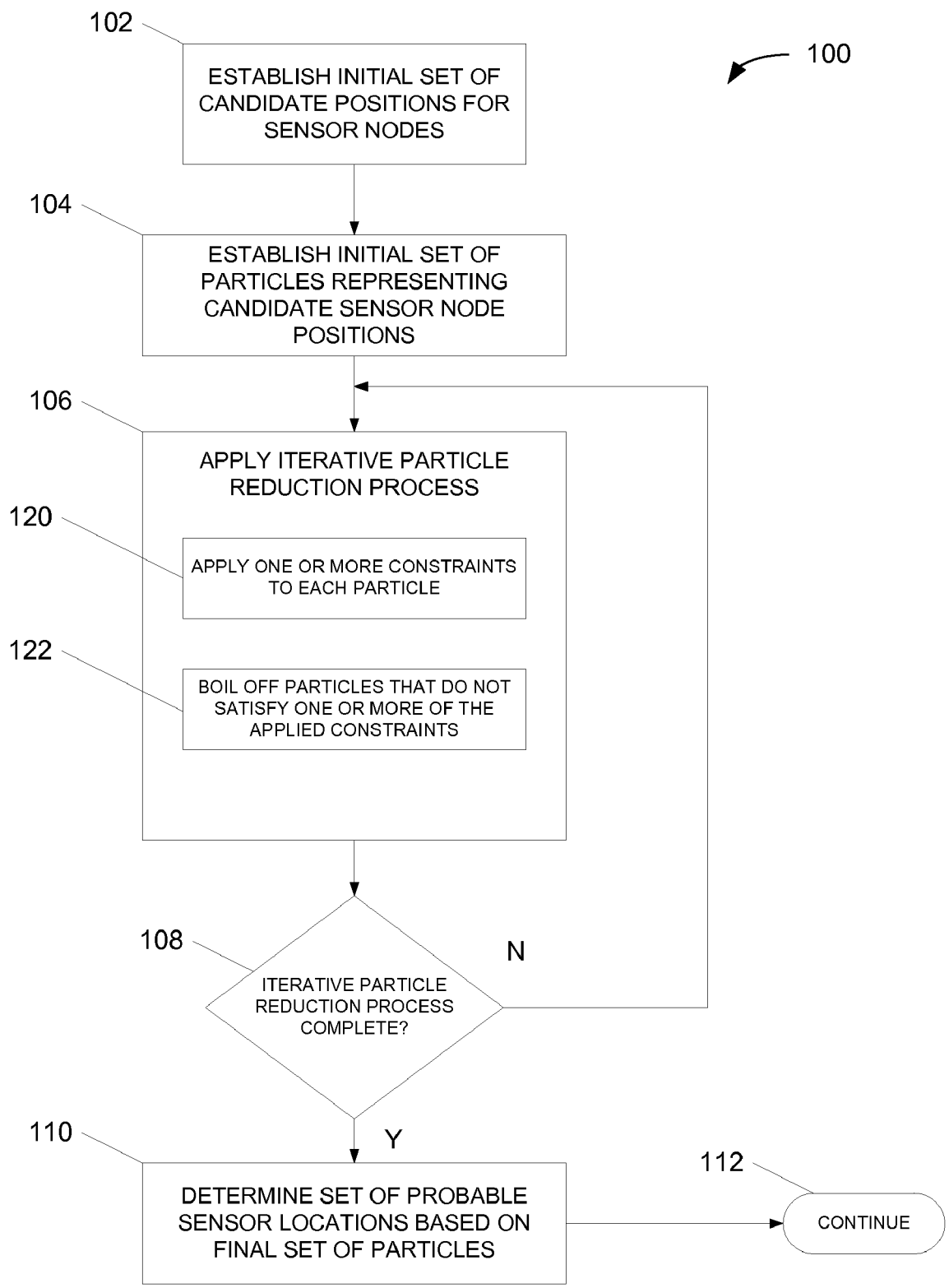
FIG. 1 is a flowchart of a method of performing localization according to an embodiment of the present invention.

The present invention relates to iterative particle reduction methods and systems for localization and pattern recognition. Many specific details of certain embodiments of the invention are set forth in the following description and in FIGS. 1-12 to provide a thorough understanding of such embodiments. One skilled in the art, however, will understand that the present invention may have additional embodiments, or that the present invention may be practiced without several of the details described in the following description.

In general, prior art methods that use particle filtering for purposes of localization typically apply Bayesian reasoning to calculate the probabilities of a set of particles (or hypotheses of positions), and then use those probability calculations as an estimate of positions. Embodiments of methods and systems in accordance with the present invention, however, perform an iterative process to determine an improved set of probability calculations, and then use the improved probability calculations to estimate positions. Thus, embodiments of the present invention apply one or more reduction steps with the same data in such a way as to iteratively remove degrees of freedom from the final solution state.

More specifically, embodiments of the invention use an iterative process (having one or more particle iterations) wherein particle probabilities are calculated, then used to eliminate some particles, and then the probabilities are calculated again. The iterative process may provide improved position determination because the actual probability of a particle is dependent upon the probabilities of the other particles, which is not known. Thus, by gradually eliminating particles, embodiments of the invention may provide improved localization system performance in comparison with prior art systems and methods.

Embodiments of the present invention may be applied to the general problem of extraction of temporal and spatial properties from distributed information without aggregating the underlying raw information. An example application for such a capability can be found in the problem of localization and navigation by a distributed sensor grid using signals of opportunity. A signal of opportunity is any form of man-made or natural signal that exists independent of the navigation system, but that may nevertheless be exploited by the system. Examples of man-made signals include television signals, radio signals, or cell phone signals. Examples of natural signals include a variety of gradients such as topographic variations, and small variations in the Earth's gravitational field.

Embodiments of the invention may provide the ability to aggregate relatively weak and ambiguous data from multiple distributed sources in order to match this data to an underlying pattern. Beginning with knowledge of one or more candidate patterns, multiple sample measurements taken from an unknown one of these patterns from distinct but unknown points in the pattern, and knowledge of constraints between sample points, embodiments of the invention provided an ability to estimate from which pattern, and from which part of the pattern, the samples were taken.

More specifically, embodiments of particle reduction techniques disclosed herein allow each measurement sample to be associated with a large number of hypotheses or "particles" that represents the set of possible patterns and locations within these patterns which the samples may have been acquired. Based on sample measurements alone, there are many possible particles for each of the sample readings. Embodiments of the present invention use an iterative reduction technique that applies constraints between readings in order to gradually eliminate particles that do not adequately satisfy these constraints. By repeatedly eliminating particles using one or more iterations applied to the same data and then reapplying constraints, a solution set of particles may be achieved that provide the best fit to the underlying pattern. In other words, embodiments of the invention apply reduction steps with the same data to iteratively remove degrees of freedom from the final solution state.

While there are a number of graph matching problems that may be suited to the particle reduction techniques disclosed herein, particular embodiments of the invention are described below with reference to the problem of localizing a distributed set of sensors without the aid of GPS (Global Positioning System). In this example, the underlying pattern is a digital elevation map, and sample measurements are elevation readings taken from a distributed set of sensors. The constraints between readings are derived from measured distances between the sensors. Embodiments of the invention advantageously provide capability to determine the sensor positions both with a threshold-based algorithm that works with little or approximately no noise, as well as with a probabilistic algorithm that works with noisy data and noisy sensor readings. Further embodiments provide the ability to exploit movement, either of the sensors or of the underlying pattern, to further enhance localization accuracy.

More specifically, embodiments of present invention may be applied to localization problem by considering an array of sensors that must cooperatively localized themselves using only locally sensed data from available signals of opportunity. In this case, an underlying knowledge of terrain and other signal sources provides an a priori pattern against which a given set of spatially disbursed pattern samples obtained from sensor data is attempted to be matched. This may be considered to be approximately equivalent to the problem of using a distributed sensor array to recognize a static pattern or a dynamically changing pattern. With each sensor having access only to a local piece of the pattern, it may be necessary for the sensors to exchange information with one another in order to come to a consistent classification of the total pattern. In some sense, this may be like trying to recognize an image depicted in a jigsaw puzzle with a collection of sensors that each see only a single piece of the puzzle. For purposes of localization and navigation, given a subset of puzzle pieces taken from a given section of the puzzle, the task of identifying the pattern contained in this section is approximately equivalent to the task of localization within the image of the puzzle.

Continuing this analogy, in the physical world, the puzzle pattern is analogous to the pattern created by a myriad of spatially distributed man-made and natural signals. There are numerous sources such as power lines, road networks and noise sources that, if taken alone and from a single point, may provide little or no information for localization. However, if viewed as a distributed pattern, and sampled from many different locations, the sources taken together have the potential to provide a great deal of information suitable for localization.

Typically, difficulties arise because there may be far too many candidate solutions to be able to exhaustively search them all. This is, in essence, a needle-in-a-haystack problem since there are very few viable solutions, but many solutions that appear viable until they are fully evaluated. Embodiments of the invention therefore take a novel approach, using a variant of particle-filtering techniques, to eliminate the "hay" until all that remain are the "needles." To do this, each sensor node may use its own locally sampled data to create an estimate of all the possible locations on the known pattern that are consistent with its observations. Embodiments of the invention represent such an estimate with a collection of particles distributed across all viable locations. With such a collection of particles for each sensor node and knowledge of constraints between sensor nodes, particles that are not valid may be eliminated until a solution set of likely locations is determined.

As previously noted, some existing localization systems typically use particle filters and a priori maps. For example, in a typical prior art system, as a robot moves, particles may be updated using a statistical motion model to arrive at a new estimate of the robot's position. Without the introduction of any additional knowledge, the more the robot moves, the more dispersed the particles may become. The introduction of known constraints (e.g. obstacles, structures, etc.), however, can reduce the particle dispersion because particles that violate these constraints can be eliminated. In general, once these types of constraints have been applied using prior art systems and methods, there is no further benefit to applying them again until particles are once again moved. This is because in prior art systems and methods, unlike embodiments of the present invention, the removal of particles due to a constraint does not have any further effect on the constraint itself.

In another aspect, embodiments of the invention may also be able to recognize dynamic patterns. The recognition of dynamic patterns may also translate directly into a distributed localization problem. In particular, for a team of moving sensors, the patterns obtained from signals of opportunity will in fact be changing dynamically over the field of sensors. Thus, even though the pattern itself may be static, the fact that we are moving across the pattern provides the sensor array with the equivalent of a dynamic pattern. Going back to the puzzle analogy, we can see that this may be equivalent to having each sensor move across the puzzle, going from one puzzle piece to the next adjacent piece. In the physical world, our moving sensors might be associated with squads of human units or robots, and would therefore be constrained in their movement. This actually provides an additional source of information for localization because we can now rule out positions that would not be traversable or reachable within a given amount of time. In such instances of mobile robot navigation and localization, knowledge of external constraints on motion combined with dead reckoning can provide a great deal of useful information for localization.

Figure 2:
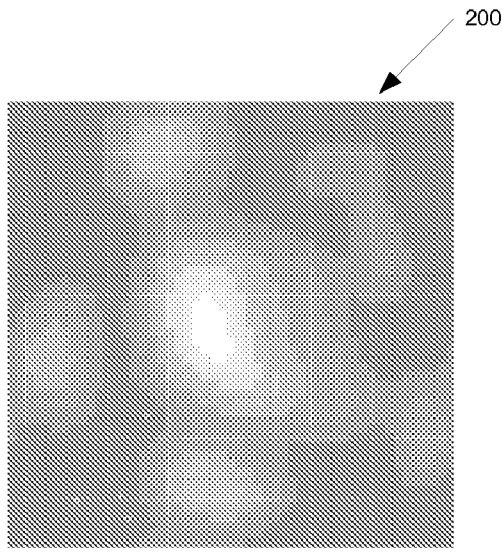
FIG. 2 is a schematic view of an initial placement of sensor nodes.

FIG. 1 is a flowchart of a method 100 of performing localization according to an embodiment of the present invention. In this embodiment, the method 100 includes establishing an initial set of candidate positions for a plurality (two or more) of sensor nodes at a block 102. FIG. 2 is a schematic view of one possible embodiment of the initial set of candidate positions 200 representing sensor nodes established at block 102 of the method 100 of FIG. 1.

Figure 3:
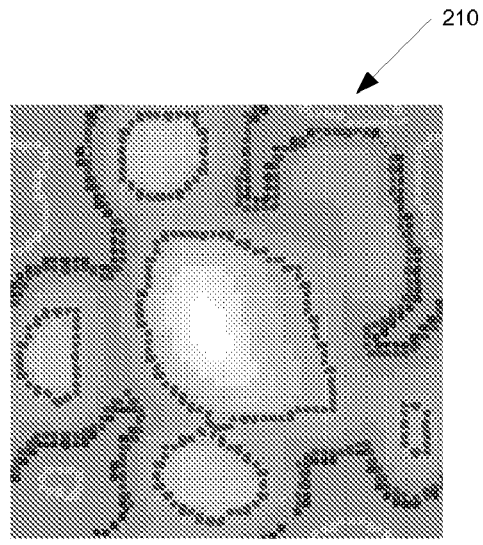
FIG. 3 is a schematic view of an initial set of particles representing the sensor nodes of FIG. 2.

At a block 104, the method 100 includes establishing an initial set of particles 210 representing the candidate positions for the sensor nodes based on their sensor readings. For example, FIG. 3 is a schematic view of a set of particles 210 corresponding to the set of sensor nodes of FIG. 2. In some embodiments, the sensors may measure their own elevation, in which case each sensor may be localized to a set of contour lines based on their respective elevation measurements. In FIG. 3, the set of particles 210 corresponds to a set of contour lines of the set of sensors (e.g. five sensors) in accordance with one particular embodiment of the invention.

Figure 4:
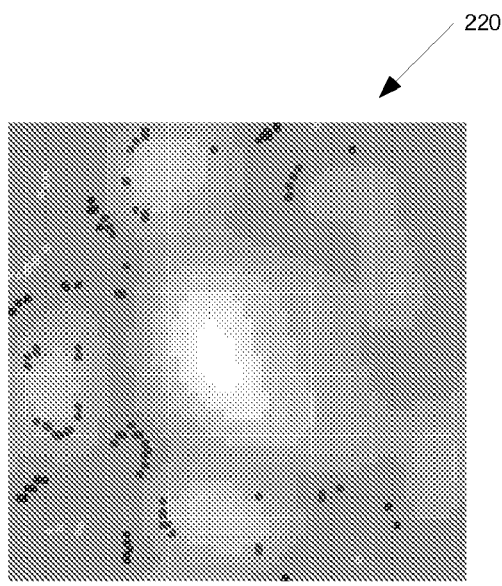
FIG. 4 is a schematic view of a reduced set of particles after some of the particles of FIG. 3 have been iteratively eliminated in accordance with an embodiment of the invention.

As further shown in FIG. 1, an iterative particle reduction process in accordance with embodiments of the present invention is applied at a block 106. For example, FIG. 4 is a schematic view of a reduced set of particles 220 after some of the particles of FIG. 3 have been iteratively eliminated in block 106 of the method 100. As described more fully below, as particles are eliminated using one or more reduction iterations, others become invalid and the iterative process may gradually (or immediately) eliminates most or approximately all particles that do not satisfy all constraints, leaving approximately only those particles that do satisfy all constraints. In an error-free environment, with no measurement uncertainty, the iterative particle reduction process (block 106) may be extremely effective at finding accurate position estimates for all sensor nodes.

Next, at a block 108, the method 100 determines whether the iterative particle reduction process (block 106) is complete based on an established (or predetermined) criterion (e.g. whether a sufficient number of particles have been eliminated, or whether all remaining particles satisfy all constraints). Again, the iterative particle reduction process (block 106) may be complete after a single iteration, or a plurality of iterations.

If it is determined at block 108 that the iterative particle reduction process is not complete, the method 100 returns to the iterative particle reduction process at block 106 for elimination of additional particles. Alternately, if it is determined that the iterative particle reduction process is complete according to the predetermined criterion (block 108), the method 100 determines a set of probable locations of the sensor nodes using a final set of particles 230 for localization of the plurality of sensors at a block 110 (e.g. for controlling movement of a moveable robot or other moveable device).

Figure 5:
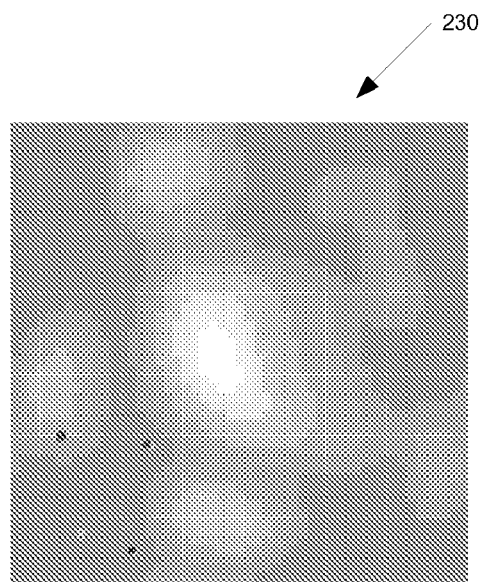
FIG. 5 is a schematic view of a final set of particles after additional particles have been iteratively eliminated in accordance with an embodiment of the invention.

Alternate embodiments of methods may use the final set of particles 230 to perform activities other than sensor localization, including for pattern recognition, for navigation of a moveable device, or any other suitable applications. At a block 112, the method 100 continues to other activities, or may simply end. FIG. 5 is a schematic view of a final set of particles 230 after additional particles have been iteratively eliminated using the iterative particle reduction process (block 106) in accordance with embodiments of the invention. This final set of particles 230 provides the most likely set of locations for the plurality of sensors given the available information and the assumed constraints.

Figure 6:
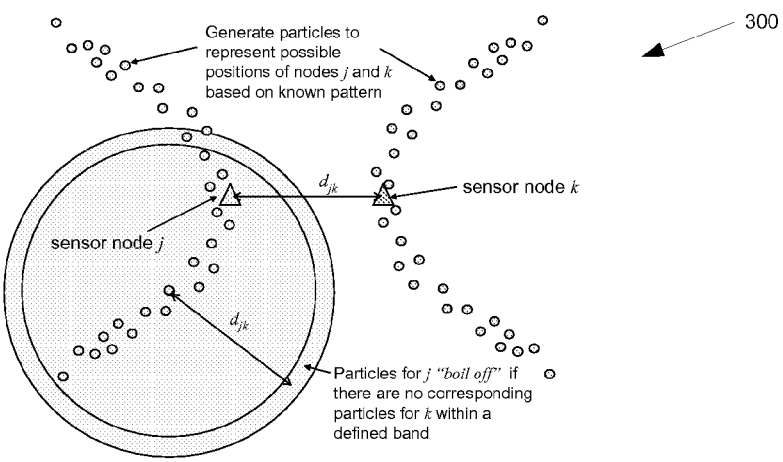
FIG. 6 shows a plurality of particles generated to represent possible positions of nodes j and k in accordance with an embodiment of the invention.

Additional details of iterative particle reduction processes (block 106) in accordance with alternate embodiments of the invention will now be described. For example, FIG. 6 shows an initial particle creation step 300 for two sensor nodes j and k (represented as triangles) in accordance with another embodiment of the invention. In FIG. 6, each small round dot represents a particle (or hypothesis) of each sensor node's position. In some embodiments, the set of particles may be created based on a correspondence between a sensor node's elevation reading and elevations obtained from a digital map. Particles may represent locations in the digital map that are at the same elevation as indicated by the sensor node's own elevation reading.

Once the particles are created, constraints may be applied to iteratively eliminate at least some of the particles using one or more reduction iterations, as depicted in block 120 of FIG. 1. As shown in FIG. 6, in some embodiments, a distance measurement $d_{jk}$ is assumed to be available between pairs of sensor nodes j and k. The distance measurement $d_{jk}$ becomes a constraint that may be used to eliminate particles that do not have corresponding sets of companion particles at the appropriate distances. In this case, the iterative particle reduction process may proceed by testing each particle to see whether there are particles corresponding to other sensors at the appropriate distances. Each particle having no such corresponding particle may then be eliminated (or "boiled off"), as represented by block 122 of FIG. 1. The elimination process may allow for a certain amount of error margin in the distance measurement $d_{jk}$. After a first pass (or iteration) is made through all the particles, the procedure (blocks 120, 122) may be repeated until no more particles can be eliminated based on the distance measurement constraint.

Figure 7:
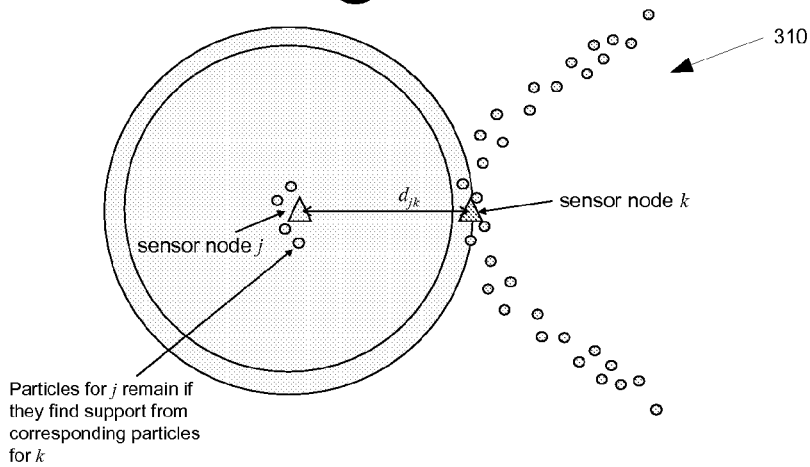
FIG. 7 shows a first portion of an elimination process that may be used for the nodes j and k of FIG. 6 in accordance with an embodiment of the invention.

To further illustrate the iterative particle reduction process, FIG. 7 shows a first portion 310 of an elimination process that may be used for the nodes j and k of FIG. 6 in accordance with an embodiment of the invention. Since particles represent potential locations for each sensor node, those that can't satisfy distance constraints may be eliminated. In the embodiment shown in FIG. 7, for example, there are only a small number of k particles corresponding to possible positions of sensor node k that are within a suitable range of distances $d_{jk}$ to any of a number of j particles corresponding to possible positions of sensor node j (and vice versa). In general, the reduction process may be more complex because it typically involves multiple nodes, and therefore, multiple pair-wise comparisons. In such cases, a particle may be eliminated if it does not have suitable correspondences to at least one particle for each of the other nodes. Thus, a domino effect may be observed where a removal of one particle leads to the removal of another, and this effect may cascade until only a few particles remain.

Figure 8:
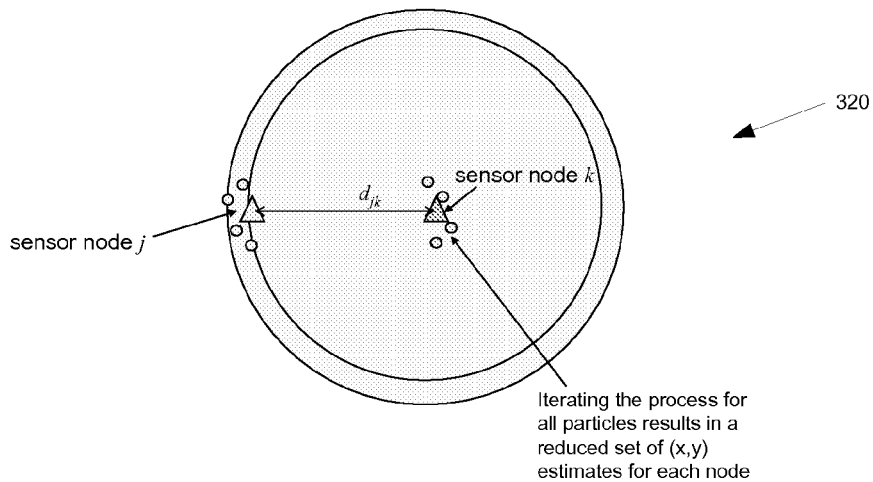
FIG. 8 shows a second portion of the elimination process that may be used for the nodes j and k of FIG. 6.

FIG. 8 shows a second portion 320 of the elimination process that may be used for the nodes j and k of FIG. 6. As the particle elimination process is iteratively performed, particles which can no longer satisfy all constraints (e.g. distance constraints) are removed. As shown in FIG. 8, only those particles which have suitable correspondences to at least one particle for each of the other nodes are not eliminated.

For conditions where there may be greater uncertainties, such as uncertainties in the measurements taken by each sensor or in the distance measurements between sensors, alternate embodiments of the present invention may be employed that use a probabilistic iterative particle reduction process. In such embodiments, in the presence of error (or uncertainty), the contour lines 210 (FIG. 3) may become contour bands, and error tolerances for distances between particles may be increased. As a result, a straightforward application of the basic iterative method (e.g. blocks 120, 122 of FIG. 1) may leave behind too many particles to provide a meaningful position estimate.

In alternate embodiments of the present invention, however, by applying probability measurements on one or more factors, such as both a particle's elevation and its distance to other particles, a probability score may be obtained for each particle. The interactive reduction method may then be revised to eliminate those particles with the lowest probability scores. After eliminating at least some of the lowest scoring particles, probabilities may be recalculated and the iterative reduction process may continue until a sufficiently reduced particles set is obtained.

Figure 9:
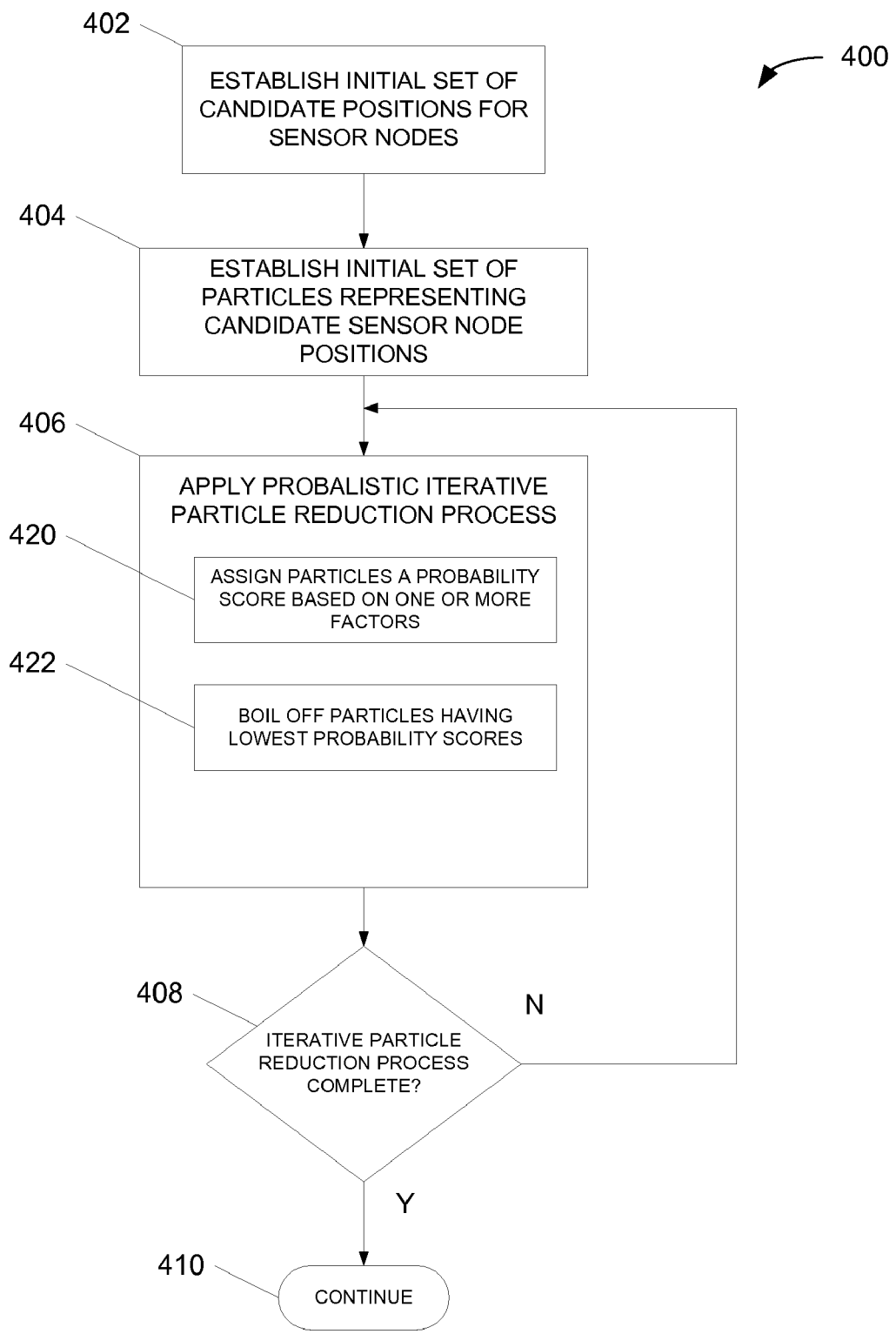
FIG. 9 shows a method of localization using an iterative particle reduction process in accordance with an alternate embodiment of the invention.

For example, FIG. 9 shows a method 400 of localization using a probabilistic iterative particle reduction process in accordance with an alternate embodiment of the invention. In this embodiment, the method 400 includes establishing an initial set of candidate positions for plurality of sensor nodes (block 402), and establishing an initial set of particles representing the candidate sensor node positions (block 404). In this embodiment, however, due to uncertainties in the candidate sensor positions, the initial set of particles may comprise contour bands that account for one or more uncertainties in the candidate sensor positions.

As further shown in FIG. 9, the method 400 includes applying a probabilistic iterative particle reduction process having one or more reduction iterations at a block 406. More specifically, each particle is assigned a probability score based on one or more factors at a block 420. For example, in one particular embodiment, probability scores may be determined by applying probability measurements based on a particle's elevation and its distance to other particles. In other embodiments, probability scores may be assigned based on one or more of the following factors:

(1) a priori probability based on how well a particle's self-indicated elevation matches the measured elevation of the particle;
(2) distances between a particle and other particles for other nodes; and
(3) the a priori probabilities of those other particles.

At a block 422, particles having relatively lower probability scores are eliminated (or "boiled off"). At a block 408, the method 400 determines whether the probabilistic iterative particle reduction process (block 406) is complete, and if not, the method 400 returns to the probabilistic iterative particle reduction process at block 406. If the reduction process (block 406) is complete, the method 400 continues (or ends) at a block 410.

More precisely, in some embodiments, the iterative probabilistic method may be defined as an iteration between a particle probability calculation and the removal of "weakest" particles according to the following calculations:

Definitions $z_n$ is the measured value at node n $h_{k_n}$ is the pattern value at particle k for node n $d_{\overline{ab}}$ is the measured distance between nodes a and b $d_{\overline{k_a j_b}}$ is the distance between particles k and j for nodes a and b $\sigma_z$ is the standard deviation for measurements z $\sigma_d$ is the standard deviation for distance measurements between nodes Compute:

Determine Particle Probabilities ⇄ Remove Weakest Particles $$p_{k_n} \propto p_{\theta k_n} \prod_{n=5} \sum_{j_n} p_{\theta j_c} p(d_{\overline{nf}} \mid d_{\overline{k_n j_c}})$$

where:

$$p_{\theta k_n} = p(z_n \mid h_{k_n}) = \frac{1}{2s\sigma_z} e^{-(z_n - h_{k_n})^2 / \sigma_x^2}$$

For each node n find particle $k_n$ with $p_{k_a} < p_{j_b} \forall j \neq k$
Remove particle $k_n$ -continued $$p(d_{\overline{ab}} | d_{\overline{k_aj_b}}) = \frac{1}{2s\sigma_d} e^{-(d_{\overline{ab}}-d_{\overline{k_aj_b}})^2/\sigma_x^2}$$

normalize:

$$p'_{k_n} = \frac{p_{k_n}}{\sum_j p_{j_n}}$$

In this iterative method, the probabilities for each individual particle are determined on a pair-wise basis with particles corresponding to each of the other sensor nodes. A given particle $k_n$ for sensor node n, for example, will compute a distance probability to particles $j_r$ corresponding to sensor node r. Each distance probability will be multiplied by the particle $j_r$'s probability based on its correspondence to the pattern measurement. These probabilities may then be summed to obtain a pair-wise net probability of particle $k_n$ relative to all particles of node r. A similar net probability is obtained for particle $k_n$ and the particles for the other nodes. These pair-wise probability scores are then multiplied to obtain a final probability score for particle $k_n$. After normalizing these scores for all particles, the relative scores may be compared, and some portion of those particles having the lowest probability scores may be eliminated. Once some of the particles had been eliminated, the cycle of re-computing probabilities and eliminating weaker particles is continued until only a few particles remain for each node.

Embodiments of probabilistic iterative particle reduction methods in accordance with the present invention may, however, experience degraded performance if there are ambiguous solutions. More specifically, in situations that involve two or more overlapping solutions that reinforce each other even though neither of them alone can satisfy all distance constraints between all particles, ambiguous solutions may result. For such situations, further embodiments of iterative particle reduction methods have been developed to augment the previously-described "bottom-up" methods (which eliminate weaker nodes) with "top-down" methods that eliminate stronger nodes.

Figure 10:
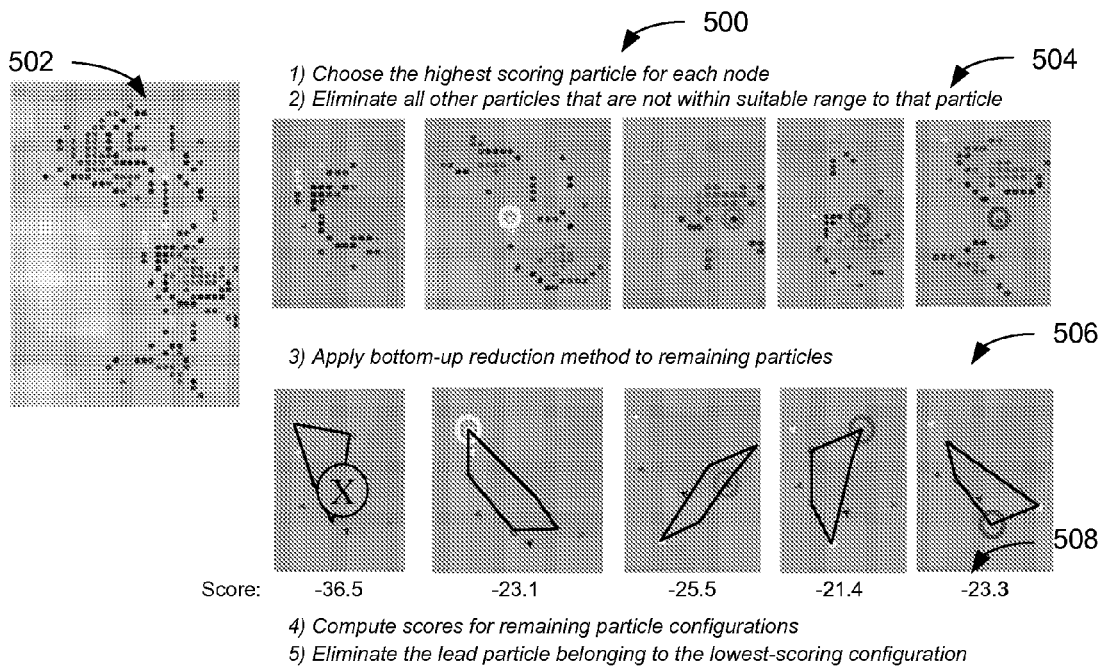
FIG. 10 shows a top-down method of particle reduction in accordance with yet another embodiment of the invention.

For example, FIG. 10 shows a top-down method 500 of particle reduction in accordance with yet another embodiment of the invention. In this embodiment, the top-down method 500 begins with a current particle set at 502. Next, a highest-ranked particle is selected for each sensor node, and for each of these highest-ranked particles, a subset of nodes is selected that loosely satisfies distance constraints to that particle, and all other particles corresponding to the same node type are removed at 504. An iterative bottom-up reduction process on each reduced particle set is then performed until a unique solution is obtained at 506. At 508, these unique solutions are scored, the lowest scoring solution is selected, and the one highest-ranked particle that led to this solution is eliminated. Also, the best scores obtained for each of the particles in these unique solutions are recorded.

In still other embodiments of the present invention, the top-down method 500 (FIG. 10) may be integrated with one or more of the bottom-up processes described above (FIGS. 1-9). Using a bottom-up process first, the particle probabilities for each particle may be determined, and then some percentage of the low-probability particles may be eliminated from consideration. A top-down process may then be performed, and one particle from the set of highest scoring particles may be eliminated. The probability calculation may then be performed again, and the bottom-up and top-down elimination processes may be repeated until only one particle for each node remains. At that point, the remaining particles are not likely to be part of the solution, since many of the high-probability particles have already been removed. The recorded scores obtained during the various top-down processes are then recovered, and the particle sets that have the highest recorded scores are reconstructed. In this way, not only are the best scoring particles restored, but also any other particles that scored close to the best score.

Further embodiments of the invention have been developed for dealing with a dynamic pattern due to sensor movement or pattern movement (or both). For these situations, a standard particle filtering approach is followed to generate candidate states once sensors have moved, and then a probabilistic reduction technique is applied to resolve these candidate states into viable position estimates.

Figure 11:
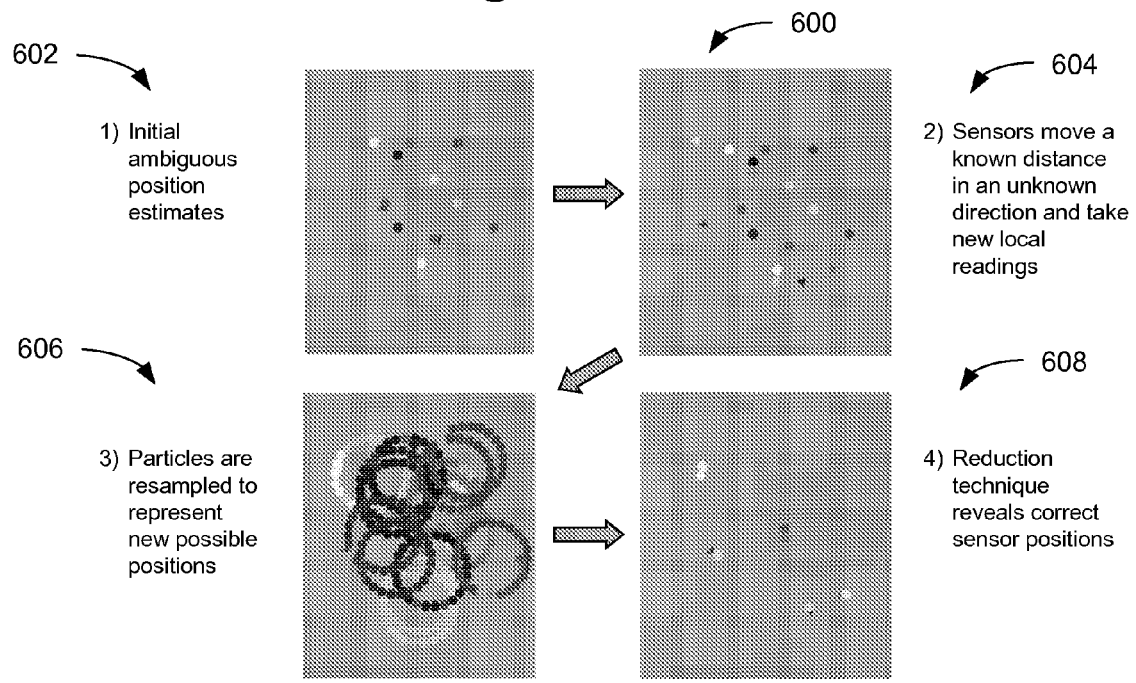
FIG. 11 shows a method of localization using particle reduction for a dynamic pattern in accordance with yet another embodiment of the invention.

More specifically, FIG. 11 shows a method 600 of localization using particle reduction for a dynamic pattern in accordance with yet another embodiment of the invention. In this embodiment, the method 600 includes starting with an initial sensor placement, and performing one or more of the above-described iterative reduction methods to obtain the highest scoring position estimates at 602. Typically, more than one acceptable solution will appear to exist at 602. Next, at 604, the sensors move and the movement is modeled by moving particles. For example, assuming that the sensors move for a known distance in an unknown direction, particles can be used to model this movement by creating a set of particles for each initial particle, and by having each of these new particles move for a set distance but each in a different direction than the others. This leads to a set of ring-like position estimates (at 606) that indicate that the sensors may be located along any point within these rings. Next, a probabilistic iterative reduction technique is applied to the particle rings at 608 in the same way that it was applied to the initial contour line estimates, thereby eliminating the ambiguous solutions found earlier.

It will be appreciated that while the localization problem provides a good concrete application for the undistributed information aggregation concepts disclosed herein, it is by no means the only problem that may be addressed by these techniques. There are a number of problems that involve uncovering a pattern that satisfies a complex set of relations from within a myriad of data. Such problems are also likely to benefit from using methods and procedures disclosed herein.

Generally, any of the functions and methods described herein can be implemented using hardware, software, firmware (e.g., fixed logic circuitry), manual processing, or any combination thereof. A software implementation represents program code that performs specified tasks when executed on a computing-based processor. The embodiments of methods described above with reference to FIGS. 1-11 may be described in the general context of computer executable instructions. Generally, computer executable instructions can include applications, routines, programs, objects, components, data structures, procedures, modules, functions, and the like that perform particular functions or implement particular abstract data types. These methods may also be practiced in a distributed computing environment where functions are performed by remote processing devices that are linked through a communications network. In a distributed computing environment, computer executable instructions may be located in both local and remote computer storage media, including memory storage devices. Further, the features described herein are platform-independent such that the techniques may be implemented on a variety of computing platforms having a variety of processors.

Figure 12:
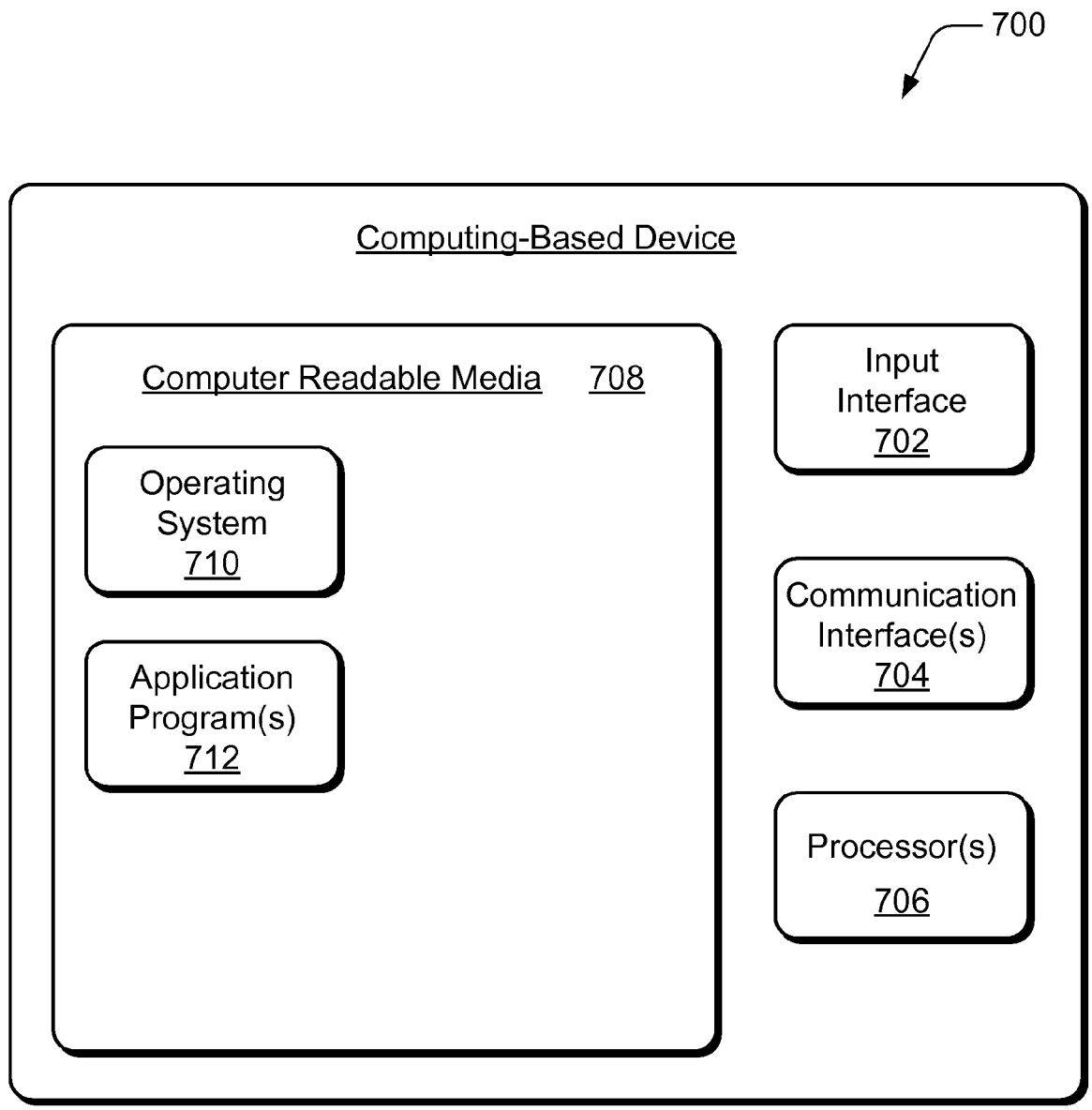
FIG. 12 illustrates an example computing-based device in accordance with still another embodiment of the invention.

FIG. 12 illustrates an example computing-based device 700 which can be implemented as any form of computing or electronic device in which embodiments of methods using iterative particle reduction can be implemented. In this embodiment, the computing-based device 700 includes an input interface 702 by which data inputs can be received. Device 700 further includes communication interface(s) 704 which can be implemented as any one or more of a serial and/or parallel interface, a wireless interface, any type of network interface, and as any other type of communication interface.

The computing-based device 700 also includes one or more processors 706 (e.g., any of microprocessors, controllers, and the like) which process various computer executable instructions to control the operation of computing-based device 700, to communicate with other electronic and computing devices, and to implement embodiments of the inventive methods described above. Computing-based device 700 can also be implemented with computer readable media 708, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 708 provides data storage mechanisms to store various information and/or data such as software applications and any other types of information and data related to operational aspects of computing-based device 700. For example, an operating system 710 and/or other application programs 712 can be maintained as software applications with the computer readable media 708 and executed on processor(s) 706 to implement embodiments of methods including iterative particle reduction procedures in accordance with the present invention.

Embodiments of the present invention may provide significant advantages over the prior art. For example, embodiments of the invention may provide the ability to aggregate relatively weak and ambiguous data from multiple distributed sources in order to match this data to an underlying pattern. By repeatedly eliminating particles and then reapplying constraints in an iterative manner, a solution set of particles may be achieved that provide the best fit to the underlying pattern. Particular embodiments of the invention may be successfully applied to the problem of localizing a distributed set of sensors without the aid of GPS. Furthermore, embodiments of the invention may advantageously provide the capability to determine sensor positions both with a threshold-based algorithm that works with little or approximately no noise, as well as with a probabilistic algorithm that works with noisy data and noisy sensor readings. Still further embodiments provide the ability to exploit movement, either of the sensors or of the underlying pattern, to further enhance localization accuracy.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method for localization of a plurality of sensor nodes, comprising using a computing-based device to:

establish a set of particles representing candidate positions for the plurality of sensor nodes;

iteratively reduce the set of particles using one or more particle reduction iterations, wherein each particle reduction iteration other than an initial particle reduction iteration eliminates at least some particles based on at least one constraint and a set of remaining particles from a prior iteration; and after performing the plurality of particle reduction iterations, determine a set of probable locations based on a final set of particles.

2. The method of claim 1, wherein iteratively reducing the set of particles includes iteratively reducing the set of particles until each particle of the set of remaining particles satisfies the at least one constraint.

3. The method of claim 1, wherein iteratively reducing the set of particles using one or more particle reduction iterations includes iteratively reducing the set of particles by applying one or more particle reduction iterations with the same data to iteratively remove degrees of freedom from a final solution state.

4. The method of claim 1, wherein iteratively reducing the set of particles includes iteratively reducing the set of particles using a plurality of particle reduction iterations, wherein each particle reduction iteration includes:

applying one or more constraints to each particle; and
eliminating one or more particles that do not satisfy the one or more applied constraints.

5. The method of claim 4, wherein applying one or more constraints to each particle includes applying a distance constraint to each particle.

6. The method of claim 1, wherein iteratively reducing the set of particles includes iteratively reducing the set of particles using a plurality of particle reduction iterations, wherein each particle reduction iteration includes a top-down process comprising:

selecting a highest-ranked particle for each a corresponding one of the sensor nodes;

selecting a subset of nodes that at least approximately satisfies one or more distance constraints to the highest-ranked particle;

removing all other particles corresponding to the corresponding one of the sensor nodes; and performing an iterative bottom-up reduction process on each reduced particle set to obtain a unique solution.

7. The method of claim 6, wherein each particle reduction iteration further includes:

scoring the unique solutions;
selecting a lowest scoring solution;
eliminating the highest-ranked particle that led to the lowest scoring solution; and
recording a highest scoring solution obtained for each of the particles in the unique solution.

8. The method of claim 1, wherein iteratively reducing the set of particles includes iteratively reducing the set of particles using a plurality of particle reduction iterations, wherein each particle reduction iteration includes performing a bottom-up reduction procedure comprising:

determining a probability for each particle, and
eliminating at least some of the particles having a relatively low probability; and
performing a top-down reduction procedure comprising:
selecting a highest-ranked particle for each sensor node;
selecting a subset of nodes that at least approximately satisfies one or more distance constraints to the highest-ranked particle;

removing all other particles corresponding to the corresponding one of the sensor nodes;

selecting a lowest scoring solution;

eliminating the highest-ranked particle that led to the lowest scoring solution; and recording a highest scoring solution obtained for each of the particles.

9. The method of claim 8, wherein determining a set of probable locations of the plurality of sensor nodes includes reconstructing the recorded particle sets having the highest scoring solutions.

10. The method of claim 1, wherein establishing a set of particles representing candidate positions for the plurality of sensor nodes includes assigning a set of probabilistic particles based on one or more factors for the plurality of sensor nodes; and iteratively reducing the set of particles using one or more particle reduction iterations includes iteratively reducing the set of particles using one or more probabilistic particle reduction iterations, wherein each probabilistic particle reduction iteration includes:

assigning a probability score to each probalistic particle based on at least one of the one or more factors; and eliminating at least one particle having a relatively low probability score.

11. The method of claim 10, wherein assigning a set of probabilistic particles includes assigning a set of probabilistic particles based on one or more of:

an a priori probability based on a match between a particle self-indicated elevation and a measured elevation of the particle;

a distance between a particle and other particles for other sensor nodes; and an a priori probability of the other particles for other sensor nodes.

12. The method of claim 10, wherein iteratively reducing the set of particles using one or more probabilistic particle reduction iterations includes iteratively reducing the set of particles by applying one or more particle reduction iterations with the same data to iteratively remove degrees of freedom from a final solution state.

13. The method of claim 10, wherein assigning a set of probabilistic particles includes:

for each individual particle of each individual sensor node, computing a pair-wise distance probability to each of the other remaining particles of the individual sensor node and all other sensor nodes;

multiplying each pair-wise distance probability by the individual particle's probability based on a correspondence to a pattern measurement to provide an intermediate probability; and summing the intermediate probabilities to obtain a pair-wise net probability of the individual particle relative to all other particles of the individual sensor node.

14. The method of claim 1, wherein iteratively reducing the set of particles includes iteratively reducing the set of particles using one or more particle reduction iterations, wherein each particle reduction iteration includes both performing a bottom-up reduction procedure; and performing a top-down reduction procedure.

15. The method of claim 1, wherein iteratively reducing the set of particles includes iteratively reducing the set of particles using a plurality of particle reduction iterations, wherein each particle reduction iteration includes at least one of:

performing a bottom-up reduction procedure comprising determining a probability for each particle, and eliminating at least some of the particles having a relatively low probability; and performing a top-down reduction procedure comprising selecting a highest-ranked particle for each sensor node; selecting a subset of nodes that at least approximately satisfies one or more distance constraints to the highest-ranked particle; removing all other particles corresponding to the corresponding one of the sensor nodes; selecting a lowest scoring solution; eliminating the highest-ranked particle that led to the lowest scoring solution; and recording a highest scoring solution obtained for each of the particles.

16. A method for localization of a plurality of moveable nodes, comprising using a computing-based device to:

establish a set of particles representing candidate positions for the plurality of moveable nodes;

iteratively reduce the set of particles using one or more particle reduction iterations to provide a set of highest scoring particles, wherein each particle reduction iteration other than an initial particle reduction iteration eliminates at least some particles based on at least one constraint and a set of remaining particles from a prior iteration;

model a movement of the plurality of moveable nodes by establishing a set of moving particles;

iteratively reduce the set of moving particles using one or more moving particle reduction iterations to provide a final set of moving particles, wherein each moving particle reduction iteration other than an initial moving particle reduction iteration eliminates at least some moving particles based on at least one constraint and a set of remaining moving particles from a prior iteration; and after performing the plurality of moving particle reduction iterations, determine a set of probable locations of the plurality of moveable nodes based on the final set of moving particles.

17. The method of claim 16, wherein modeling a movement of the plurality of moveable nodes includes establishing a set of moving particles for each initial particle assuming that the moveable nodes move for a known distance in a different direction than the other moveable nodes.

18. The method of claim 16, wherein iteratively reducing the set of moving particles includes iteratively reducing the set of moving particles using one or more moving particle reduction iterations, wherein each moving particle reduction iteration includes at least one of performing a bottom-up reduction procedure; and performing a top-down reduction procedure.

19. The method of claim 16, wherein iteratively reducing the set of moving particles includes iteratively reducing the set of moving particles using one or more moving particle reduction iterations, wherein each moving particle reduction iteration includes at least one of:

performing a bottom-up reduction procedure comprising determining a probability for each moving particle, and eliminating at least some of the moving particles having a relatively low probability; and performing a top-down reduction procedure comprising selecting a highest-ranked moving particle for each moveable node; selecting a subset of moveable nodes that at least approximately satisfies one or more distance constraints to the highest-ranked moving particle; removing all other moving particles corresponding to the corresponding one of the moveable nodes; selecting a lowest scoring solution; eliminating the highest-ranked moving particle that led to the lowest scoring solution; and recording a highest scoring solution obtained for each of the moving particles.

20. A method of navigating at least one moveable device, comprising using a computing-based device to perform at least one of:
    establishing a set of particles representing candidate positions for the at least one moveable device;
    iteratively reducing the set of particles using one or more particle reduction iterations, wherein each particle reduction iteration other than an initial particle reduction iteration eliminates at least some particles based on at least one constraint and a set of remaining particles from a prior iteration;
    after performing the plurality of particle reduction iterations, determining a probable location of the at least one moveable device based on a final set of particles.

21. The method of claim 20, wherein iteratively reducing the set of particles includes iteratively reducing the set of particles until each particle of the set of remaining particles satisfies the at least one constraint.

22. The method of claim 20, wherein iteratively reducing the set of particles using one or more particle reduction iterations includes iteratively reducing the set of particles by applying one or more particle reduction iterations with the same data to iteratively remove degrees of freedom from a final solution state.

23. A method comprising:
    using a plurality of sensors to provide a plurality of measured values;
    using the measured values to establish an initial set of particles representing candidate positions of the sensors; and
    iteratively eliminating those particles that do not satisfy a distance-based constraint, including testing each particle to see whether there are companion particles corresponding to other sensors at the appropriate distances, and eliminating those particles that do not have corresponding sets of companion particles at appropriate distances.

24. A system comprising the plurality of sensors of claim 23 and a computing-based device for using the measured values and performing the iterative elimination as recited in claim 23.

25. An article comprising a computer readable medium encoded with data for causing a computing-based device to establish a set of particles representing candidate positions for a plurality of sensor nodes; iteratively reduce the set of particles using one or more particle reduction iterations, wherein each particle reduction iteration other than an initial particle reduction iteration eliminates at least some particles based on at least one constraint and a set of remaining particles from a prior iteration; and after performing the plurality of particle reduction iterations, determine a set of probable locations based on a final set of particles.

26. The article of claim 25, wherein iteratively reducing the set of particles includes iteratively reducing the set of particles using a plurality of particle reduction iterations, wherein each particle reduction iteration includes:
    applying one or more constraints to each particle; and
    eliminating one or more particles that do not satisfy the one or more applied constraints.

27. The article of claim 26, wherein applying one or more constraints to each particle includes applying a distance constraint to each particle.

28. The article of claim 25, wherein iteratively reducing the set of particles includes iteratively reducing the set of particles using a plurality of particle reduction iterations, wherein each particle reduction iteration includes a top-down process comprising:
    selecting a highest-ranked particle for each a corresponding one of the sensor nodes;
    selecting a subset of nodes that at least approximately satisfies one or more distance constraints to the highest-ranked particle;
    removing all other particles corresponding to the corresponding one of the sensor nodes; and
    performing an iterative bottom-up reduction process on each reduced particle set to obtain a unique solution.

29. The article of claim 25, wherein
    establishing a set of particles representing candidate positions for the plurality of sensor nodes includes assigning a set of probabilistic particles based on one or more factors for the plurality of sensor nodes; and
    iteratively reducing the set of particles using one or more particle reduction iterations includes iteratively reducing the set of particles using one or more probabilistic particle reduction iterations, wherein each probabilistic particle reduction iteration includes:
        assigning a probability score to each probalistic particle based on at least one of the one or more factors; and
        eliminating at least one particle having a relatively low probability score.

* * * * *